Patented Apr. 24, 1928.

1,667,446

UNITED STATES PATENT OFFICE.

CARL STEFFEN, JR., OF VIENNA, AUSTRIA.

PROCESS FOR OBTAINING TRICALCIUM SACCHARATE.

No Drawing. Application filed April 27, 1926, Serial No. 105,012, and in Austria November 17, 1925.

This invention relates to the production of tricalcium saccharate and has for its object to provide an improved process designed to enable tricalcium saccharate of an uncommonly high degree of purity to be obtained.

The tricalcium saccharate produced from impure sugar solutions can be separated only partially from the non-sugar dissolved in its water content (about 68%). In order to remove the non-sugar from the tricalcium saccharate which has been separated by filtering and pressing, various washing processes have been used, but none of these has yet succeeded in giving a purity of the tricalcium saccharate of above 96%. Thus, it is customary to prepare calcium saccharate by treating a molasses or impure sugar solution with lime powder to precipitate the calcium saccharate, conduct the saccharate suspension to a filter press, filter off the suspension and wash the filter cake of saccharate with water. It is virtually impossible to remove all of the soluble non-sugar impurities in the filter cake by washing with water. One of the reasons for this is that during the filtering of the saccharate suspension under pressure, the filter cake cracks so that the washing water, following the line of least resistance, passes through the cracks which, of course, means that a thorough washing of the filter cake is impossible. It has been suggested to form a suspension of water and finely ground insoluble substances and use this suspension as a washing liquid, the theory being that the insoluble substances in suspension fill up the cracks in the calcium saccharate cake. But by this expedient, foreign substances are introduced into the calcium saccharate filter cake which possess a higher filtration capacity than the filter cake itself.

The present invention really consists in preparing a washing liquid in the tricalcium saccharate of a high degree of purity in suspension, the tricalcium saccharate thus fills up the cracks in the filter cake of tricalcium saccharate to be washed. The advantage of this is apparent. No foreign substances are introduced into the filter cake and the crack-filling medium has the same filtration capacity as the filter cake. By the process according to the invention the tricalcium saccharate has been successfully relieved of approximately the whole of its non-sugar content, and tricalcium saccharate with a purity of 99%, or even slightly higher, has been successfully produced.

In carrying out my invention, I prepare a tricalcium saccharate suspension to be used as a washing liquid by mashing with water a tricalcium saccharate filter cake previously obtained. Instead of water I may use lime water. A dilute saccharate suspension is thus formed and in this step, a part of the tricalcium saccharate decomposes. This is because tricalcium saccharate may be decomposed by water.

To this mashed saccharate suspension fresh quantities of calcium oxide powder are supplied for the reprecipitation of the sugar which has gone into solution. The addition of the calcium oxide forms tricalcium saccharate from the sugar liberated as a result of the decomposition referred to. This is a necessary step in my process since I must use as a washing liquid a suspension of tricalcium saccharate as pure as possible.

The tricalcium saccharate suspension so prepared is then used to wash filter cakes of tricalcium saccharate subsequently prepared from dilute molasses or impure sugar solutions.

After the washing with the above described saccharate suspension, the saccharate after being subjected to the washing contains only traces of non-sugar, as the washing liquid has but very minute amounts of non-sugar; thus saccharates are obtained with a purity of 99% and over.

The process can be carried out specifically as follows: A tricalcium saccharate which has been washed and rinsed under high pressure in a filter press and filtered off is mashed with water or lime water amounting to from 7 to 8 times the amount of the saccharate. To this mashed saccharate fresh amounts of lime are supplied for the partial precipitation of the sugar gone into solution, this being continued until the desired limit of precipitation is reached, viz till 0.4 to 0.5% of sugar remains in solution. After the reprecipitation of the sugar in the form of tricalcium saccharate the tricalcium saccharate suspension thus produced is used as washing liquid for fresh tricalcium saccharate, which has been obtained by the precipitation of sugar from a molasses or impure sugar solution by means of lime powder, as above referred to. This is pressed off in a filter press under a pressure of from 2 to 2½ atmospheres.

When this pressure is reached, the supply of the impure saccharate suspension is terminated and now the saccharate suspension serving as washing liquid is further pressed upon the press. Since the said washing liquid has a content of dry substance amounting to about 5 to 6%, an increase of pressure takes place in the press; when a pressure of from 4½ to 5 atmospheres is reached the washing process is terminated. By this great increase of pressure the water content of the raw saccharate is completely removed and in its place the water content of the washing saccharate is substituted. In order to obtain this pressure of from 4½ to 5 atmospheres it is necessary to supply to the press double the volume of washing liquid which would fill the press.

The consumption of lime is with this method of working somewhat increased, but this increase of consumption of lime is abundantly counter-balanced by obtaining a very high degree of purity.

Of the tricalcium saccharate obtained about 25% is returned into the mashing and de-sugaring process for the washing process, while the remaining 75% is supplied to the separating process.

What I claim is:

1. In the process of washing a filter cake of impure tricalcium saccharate containing soluble non-sugars, the step which comprises washing the cake under pressure with a tricalcium saccharate suspension substantially free of soluble non-sugars.

2. In the process of preparing substantially pure tricalcium saccharate, the steps which comprise mashing tricalcium saccharate with water to form a dilute saccharate suspension, adding quantities of lime thereto to reprecipitate tricalcium saccharate which has been partly decomposed by the mashing operation, to form a tricalcium saccharate suspension, and washing under pressure an impure filter cake of tricalcium saccharate with said prepared tricalcium saccharate suspension.

3. The process as in claim 2 in which the water used in the mashing operation contains lime.

In testimony whereof I affix my signature.

CARL STEFFEN, Junior.